(12) United States Patent
Saulsbury et al.

(10) Patent No.: US 7,124,160 B2
(45) Date of Patent: Oct. 17, 2006

(54) PROCESSING ARCHITECTURE HAVING PARALLEL ARITHMETIC CAPABILITY

(75) Inventors: Ashley Saulsbury, Los Altos, CA (US); Daniel S. Rice, Oakland, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 414 days.

(21) Appl. No.: 09/801,564

(22) Filed: Mar. 8, 2001

(65) Prior Publication Data

US 2002/0035589 A1 Mar. 21, 2002

Related U.S. Application Data

(60) Provisional application No. 60/187,901, filed on Mar. 8, 2000.

(51) Int. Cl.
 *G06F 7/38* (2006.01)
(52) U.S. Cl. ...................................... 708/490
(58) Field of Classification Search ................ 708/490, 708/523, 670–714, 518, 524
 See application file for complete search history.

(56) References Cited

U.S. PATENT DOCUMENTS

| | | | | |
|---|---|---|---|---|
| 3,694,642 A | * | 9/1972 | Grannis ...................... | 708/671 |
| 3,993,891 A | * | 11/1976 | Beck et al. .................. | 708/710 |
| 5,687,338 A | | 11/1997 | Boggs et al. | |
| 5,701,263 A | * | 12/1997 | Pineda ........................ | 708/402 |
| 5,754,457 A | * | 5/1998 | Eitan et al. .................. | 708/402 |
| 5,793,655 A | * | 8/1998 | Harlap et al. ................ | 708/201 |
| 5,831,885 A | * | 11/1998 | Mennemeier ............... | 708/650 |
| 5,864,703 A | * | 1/1999 | van Hook et al. ........... | 708/490 |
| 5,880,979 A | * | 3/1999 | Mennemeier et al. ....... | 708/201 |
| 5,898,601 A | * | 4/1999 | Gray et al. .................. | 708/203 |
| 5,900,011 A | | 5/1999 | Saulsbury et al. | |
| 5,909,572 A | | 6/1999 | Thayer et al. | |
| 5,915,109 A | * | 6/1999 | Nakakimura et al. ........ | 708/552 |
| 5,933,650 A | | 8/1999 | van Hook et al. | |
| 5,957,996 A | * | 9/1999 | Shiraishi ..................... | 708/201 |
| 5,959,874 A | * | 9/1999 | Lin et al. .................... | 708/700 |
| 6,016,543 A | * | 1/2000 | Suzuki et al. ............... | 712/233 |
| 6,115,812 A | * | 9/2000 | Abdallah et al. ............ | 708/520 |
| 6,128,702 A | | 10/2000 | Saulsbury et al. | |
| 6,141,675 A | * | 10/2000 | Slavenburg et al. ......... | 708/706 |

(Continued)

FOREIGN PATENT DOCUMENTS

WO WO 80/01423 A1 7/1980

OTHER PUBLICATIONS

Philips Inc., An Introduction to Very-long Instruction Word (VLIW) computer architecture, Aug. 6, 1997, Philips Semiconductors, Pub#: 9397-750-01759, pp. 1-11.*

(Continued)

*Primary Examiner*—Kakali Chaki
*Assistant Examiner*—Chat C. Do
(74) *Attorney, Agent, or Firm*—Townsend and Townsend and Crew LLP

(57) ABSTRACT

According to the invention, a processing core is disclosed that includes a first source register, a number of second operands, a destination register, and a number of arithmetic processors. A bitwise inverter is coupled to at least one of the first number of operands and the second number of operands. The first source register includes a plurality of first operands and the destination register includes a plurality of results. The number of arithmetic processors are respectively coupled to the first operands, second operands and results, wherein each arithmetic processor computes one of a sum and a difference of the first operand and a respective second operand.

20 Claims, 9 Drawing Sheets

U.S. PATENT DOCUMENTS

| | | | | |
|---|---|---|---|---|
| 6,243,730 | B1* | 6/2001 | Wang | 708/401 |
| 6,377,970 | B1* | 4/2002 | Abdallah et al. | 708/603 |
| 6,397,235 | B1* | 5/2002 | Van Eijndhoven et al. | 708/401 |
| 6,408,320 | B1* | 6/2002 | Shiell | 708/714 |
| 6,675,286 | B1* | 1/2004 | Sun et al. | 712/215 |
| 6,839,728 | B1* | 1/2005 | Pitsianis et al. | 708/620 |

OTHER PUBLICATIONS

"UltraSPARC™ The Visual Instruction Set (VIS™): On Chip Support for New-Media Processing," Sun Microsystems, Hardware & Networking, Microelectronics, White Paper, retrieved from the Internet: http://www.sun.com/microelectronics/whitepapers/_wp95-022, printed Jun. 4, 1999.

8XC251SB Embedded Microcontroller User's Manual, Order No. 272617-001, Intel, Feb. 1995, A1-A144.

Manual for M32000D3FP, Single Chip 32-Bit CMOS Microcomputer, Mitsubishi Microcomputers, Mitsubishi Electric, May 1998.

Subramania Sudharsanan, "MAJC-5200: A High Performance Microprocessor for Multimedia Computing," Sun Microsystems, Inc., Paul Alto, CA.

VIS™ Instruction Set User's Manual, Sun Microsystems, Inc., Palo Alto, CA, Mar. 2000.

VIS™ Instruction Set User's Manual, Sun Microsystems, Sun Microelectronics, Mountain View, CA, Part No. 805-1394-01, Jul. 1997.

Ruby B. Lee, Hewlett-Packard, "Subword Parallelism with MAX-2," Aug. 1996 IEEE.

* cited by examiner

PROCESSING ARCHITECTURE HAVING PARALLEL ARITHMETIC CAPABILITY

This application claims the benefit of U.S. Provisional Application No. 60/187,901 filed on Mar. 8, 2000.

CROSS-REFERENCES TO RELATED APPLICATIONS

This application is being filed concurrently with related U.S. patent applications: Ser. No. 09/802,017, entitled "VLIW Computer Processing Architecture with On-chip DRAM Usable as Physical Memory or Cache Memory"; Ser. No. 09/802,289, entitled "VLIW Computer Processing Architecture Having a Scalable Number of Register Files"; Ser. No. 09/802,108, entitled "Computer Processing Architecture Having a Scalable Number of Processing Paths and Pipelines"; Ser. No. 09/802,324, entitled "VLIW Computer Processing Architecture with On-chip Dynamic RAM"; Ser. No. 09/802,120, entitled "Computer Processing Architecture Having the Program Counter Stored in a Register File Register"; Ser. No. 09/802,196, entitled "Processing Architecture Having an Array Bounds Check Capability"; Ser. No. 09/802,121, entitled "Processing Architecture Having an Array Bounds Check Capability"; Ser. No. 09/802,020, entitled "Processing Architecture Having a Matrix Transpose Capability"; and, Ser. No. 09/802,291, entitled "Processing Architecture Having a Compare Capability"; all of which are incorporated herein by reference.

BACKGROUND OF THE INVENTION

The present invention relates generally to an improved computer processing instruction set, and more particularly to an instruction set having a parallel arithmetic capability.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general purpose computing. However, there is a need to further achieve instruction-level parallelism through other techniques.

SUMMARY OF THE INVENTION

The present invention performs arithmetic functions in parallel. In one embodiment, a processing core is disclosed that includes a first source register, a number of second operands, a destination register, and a number of arithmetic processors. A bitwise inverter is coupled to at least one of the first number of operands and the second number of operands. The first source register includes a plurality of first operands and the destination register includes a plurality of results. The number of arithmetic processors are respectively coupled to the first operands, second operands and results, wherein each arithmetic processor computes one of a sum and a difference of the first operand and a respective second operand.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Introduction

The present invention provides a novel computer processor chip having a number of sub-instructions that perform arithmetic functions in parallel. Additionally, these sub-instructions allow for prescaling or inverting an operand. Further, these sub-instructions can use both register and immediate addressing. As one skilled in the art will appreciate, performing arithmetic functions in parallel and performing prescaling and inverting of operands increases the instructions issued per clock cycle (IPC). Furthermore, allowing for both register and immediate addressing increases the options available to the compiler or programmer that increases efficiency.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
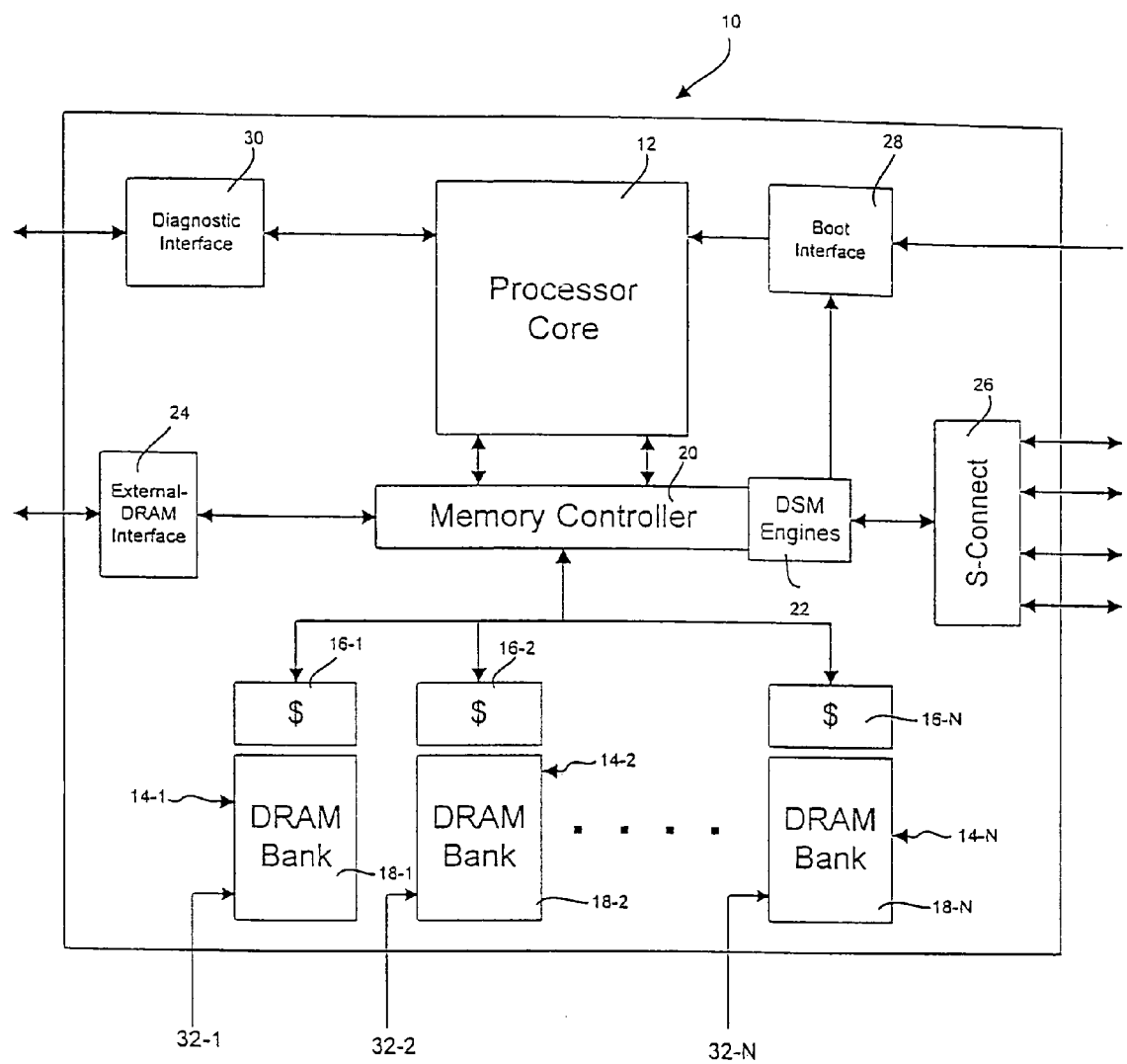
FIG. 1 is a block diagram of an embodiment of a processor chip having the processor logic and memory on the same integrated circuit.

With reference to FIG. 1, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, I/O mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
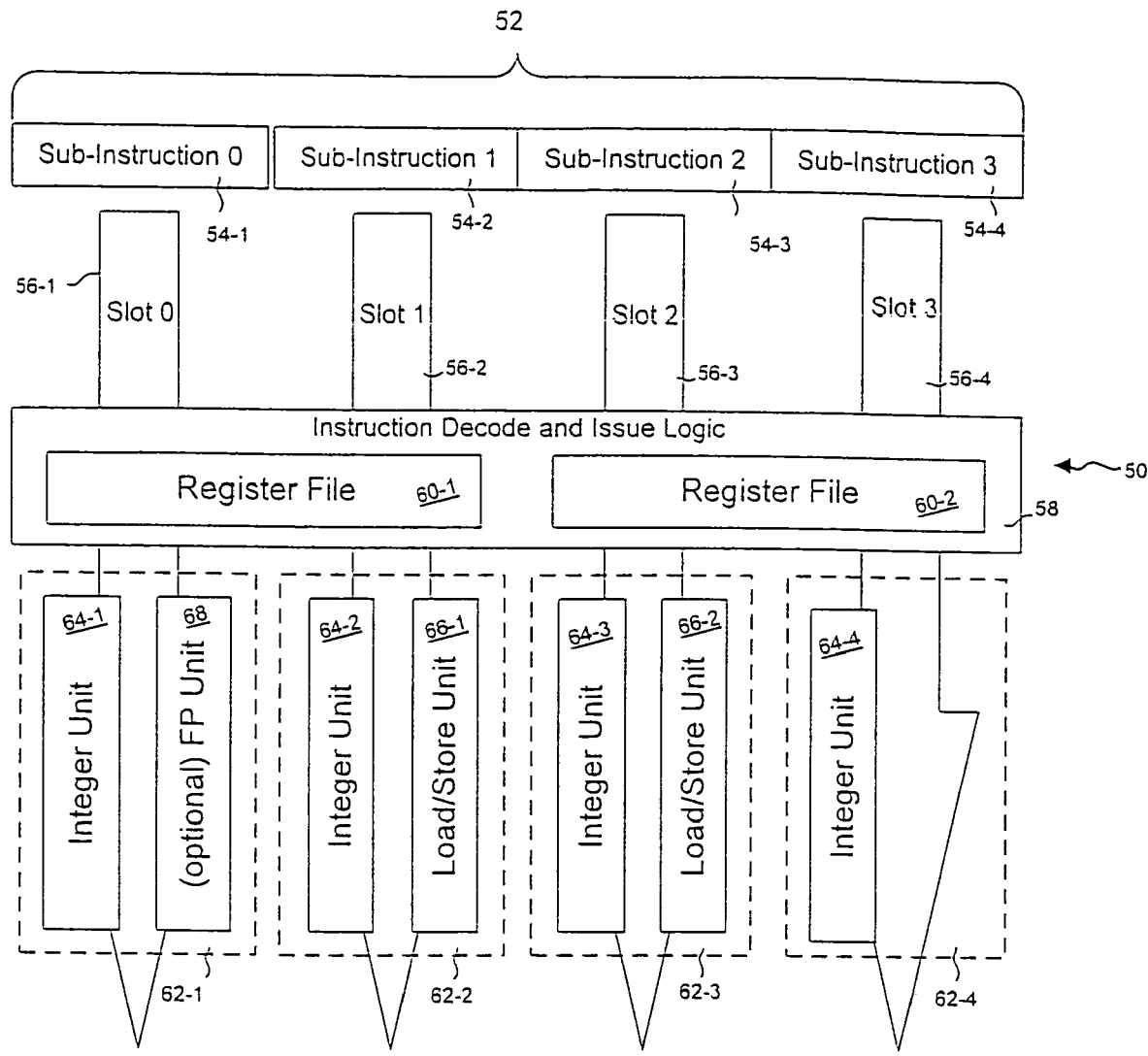
FIG. 2 is block diagram illustrating one embodiment of a processing core having a four-way VLIW pipeline design.

Referring now to FIG. 2, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56.

Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 2, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a register. For example, there may be different data types associated with signed integer, unsigned integer, single-precision floating point, and double-precision floating point values. Additionally, a register may be subdivided or partitioned to hold a number of values in separate fields. These subdivided registers are operated upon by single instruction multiple data (SIND) instructions.

Figure 3:
FIG. 3 is a diagram showing some data types generally available to the processor chip.
Figure 3:
Figure 3:
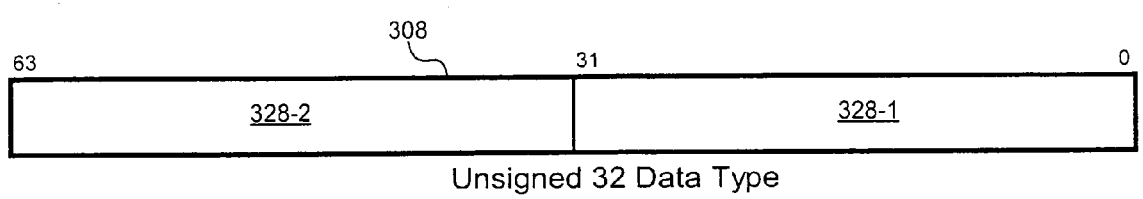
Figure 3:
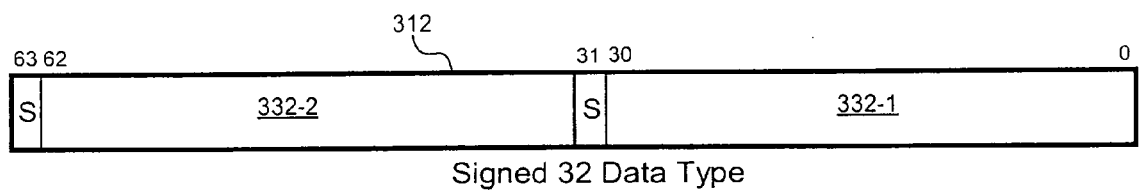
Figure 3:
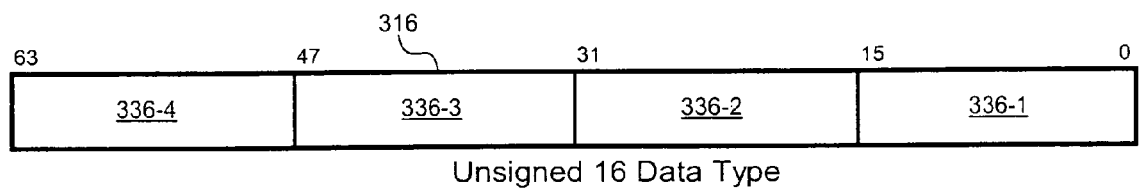
Figure 3:
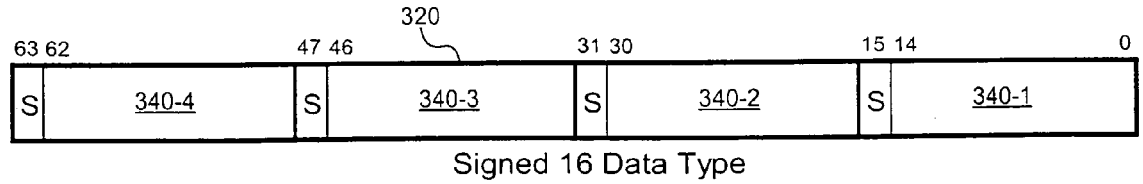
Figure 3:
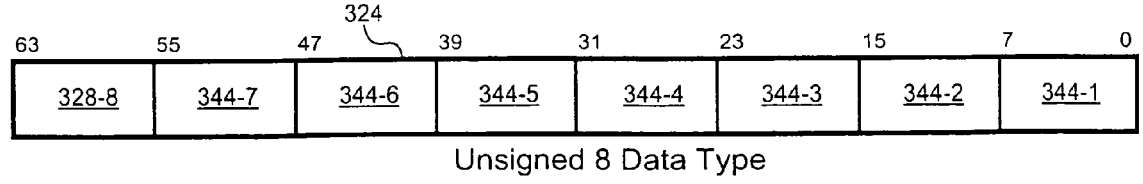

With reference to FIG. 3, some of the data types available for the sub-instructions are shown. In this embodiment, the registers are sixty-four bits wide. Some registers are not subdivided to hold multiple values, such as the signed and unsigned 64 data types 300, 304. However, the partitioned data types variously hold two, four or eight values in the sixty-four bit register. The data types which hold two or four data values can hold the same number of signed or unsigned integer values. The unsigned 32 data type 304 holds two thirty-two bit unsigned integers while the signed 32 data type 308 holds two thirty-two bit signed integers 328. Similarly, the unsigned 16 data type 312 holds four sixteen bit unsigned integers 332 while the signed 16 data type 316 holds four sixteen bit signed integers 340. In this embodiment, the data type that holds eight values is only available as an unsigned 8 data type 324. As those skilled in the art appreciate, there are other possible data types and this invention is not limited to those described above.

Although there are a number of different data types, a given sub-instruction 54 may only utilize a subset of these. For example, the parallel addition and subtraction operations only utilize the various partitioned data types that hold more than one operand. As becomes clear below, the signed and unsigned 64 data types are not needed when performing parallel arithmetic.

4. Parallel Arithmetic Instruction

Figure 4:
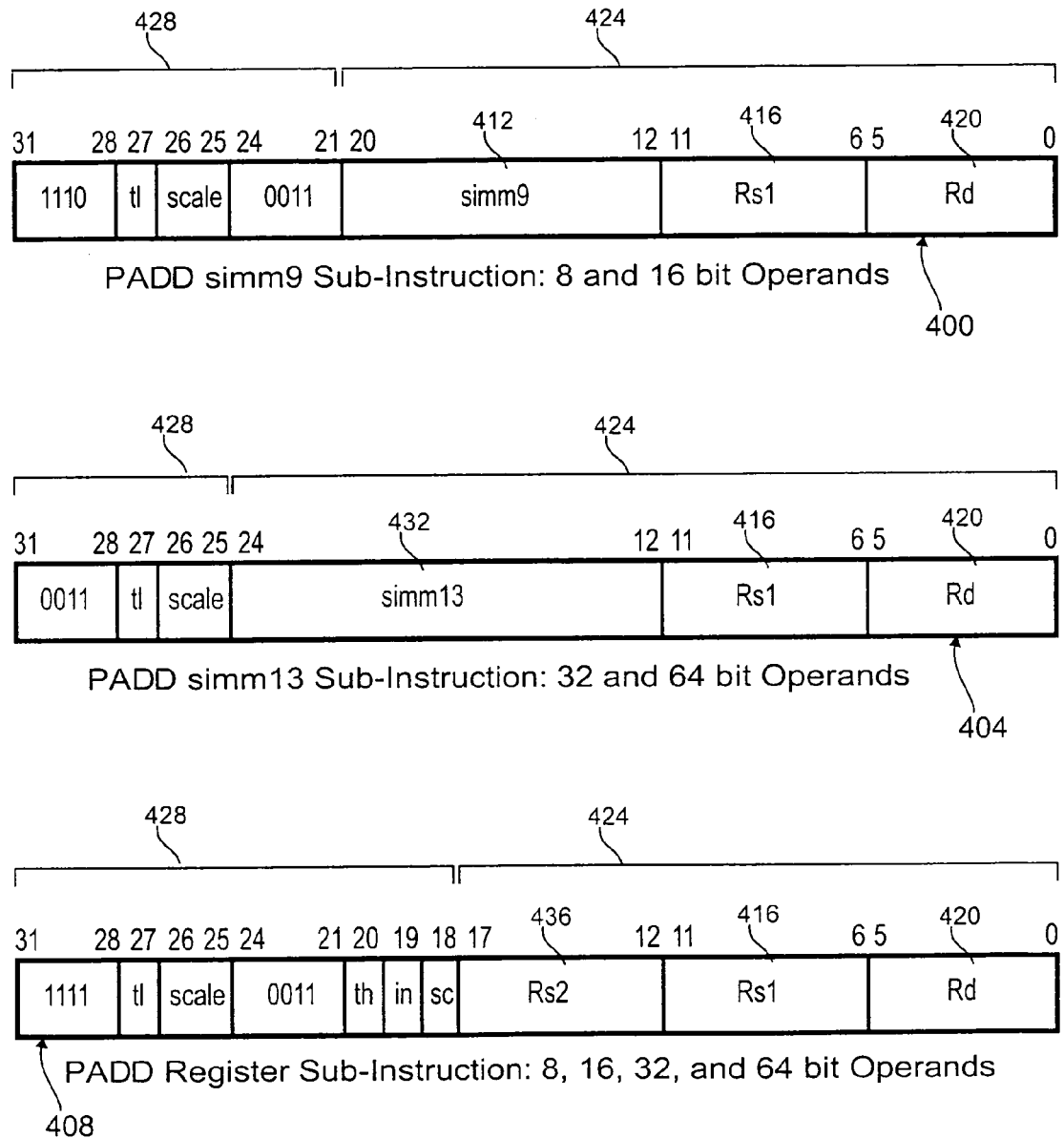
FIG. 4 is a diagram showing one embodiment of machine code syntax for parallel addition and subtraction.

Referring next to FIG. 4, the machine code for the three variations of parallel add and subtract sub-instructions 54 are shown. The three variations are a signed immediate nine bit form ("simm9") 400, signed immediate thirteen bit form ("simm13") 404 and register form 408. The sub-instructions 54 are thirty-two bits wide such that a four-way VLIW processor with a one hundred and twenty-eight bit wide instruction word 52 can accommodate execution of four sub-instructions 54 at a time. Each sub-instruction 54 is divided into an address and op code portions 424, 428. Generally, the address portions 424 contain the information needed to load and store the operators, and the op code portion 428 indicates which function to perform with the operators. Although the discussion occasionally refers to a parallel add function, it is to be understood that the parallel add function includes various related functions such as subtraction, subtraction without carry, and addition with a carry bit.

The simm9 form 400 adds or subtracts a simm9 value 412 and a number of operands at a first source address ("Rs1") 416 and puts the result in a partitioned destination register at a destination address ("Rd") 420. The addition is a two's complement addition. The simm9 value is sign extended to the full width required for each parallel add. Bits 20–12 of the sub-instruction 412 indicate which of the sixty-four source registers in the register file 60 the simm9 value 412 is loaded from, bits 6–11 indicate which of the source registers the source operands are loaded from, and bits 0–5 indicate which of the destination registers the results from the sub-instruction are stored to. The addition or subtraction is performed in parallel such that the simm9 value is added to each operand in the partitioned first source register.

Figure 5:
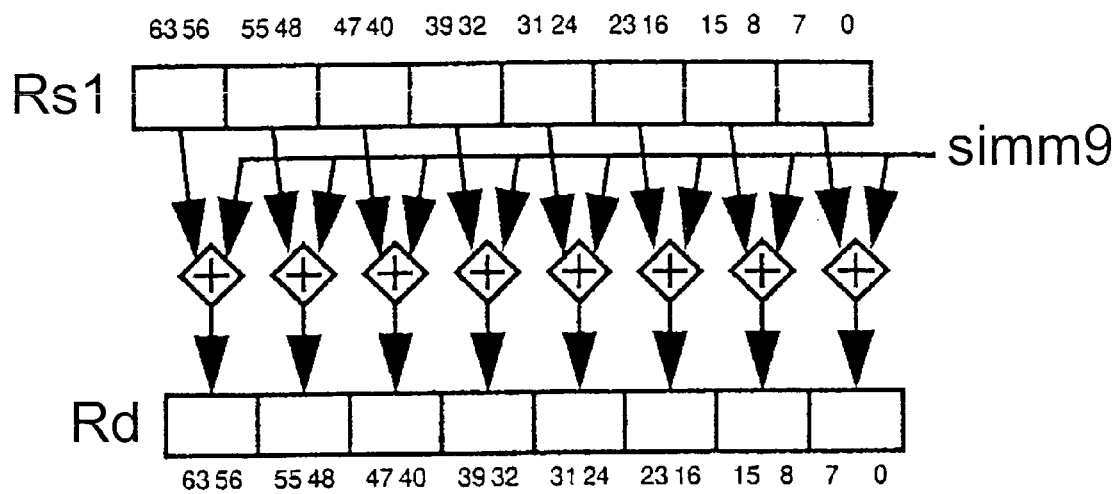
FIG. 5 is a block diagram which schematically illustrates an embodiment of a parallel add and subtract function performed between a signed nine bit immediate value and a partitioned source register with multiple operands.

FIG. 5 functionally depicts an example of the parallel add of the operands in the first source register to the simm9 value where the result is written into the destination register. In this example, both the first source register and the destination register use the unsigned 8 data type 324. Although the unsigned 8 data type 324 has 8 operands, other data types allow loading of 2 or 4 operands from the sixty-four bit wide first source register. Further, processing cores with different sized registers could support additional partitioning configurations.

The thirteen bit signed immediate (simm13) form 404 of the parallel add sub-instruction is similar to the simm9 form 400 with a few exceptions. Sub-instructions 54 that use the simm13 addressing method operate in the same way as the simm9 addressing, except the immediate value is larger. To accommodate the larger immediate value, the width of the op code 428 is reduced from eleven to seven bits. Although less op code is available, it is desirable to have the larger signed immediate form 404 when manipulating larger operands. Accordingly, this embodiment limits the simm13 form 404 of the sub-instruction 54 to thirty-two bit parallel adds and sixty-four bit adds. However, other embodiments could also use the larger simm13 form 404 with smaller operands.

Figure 6:
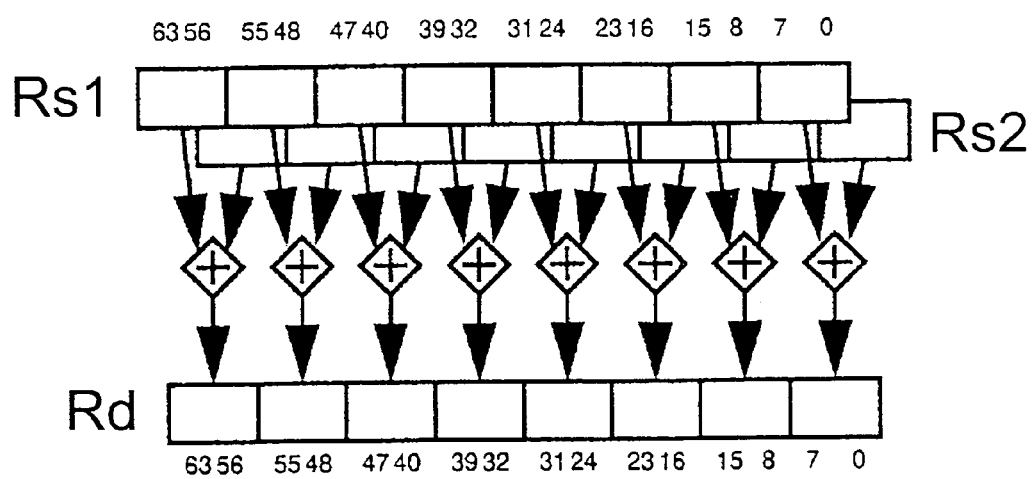
FIG. 6 is a block diagram that schematically illustrates one embodiment of a parallel add and subtract function performed between two partitioned source registers.

The register form 408 of the sub-instruction utilizes three registers. A first and second source addresses 416, 436 are used to load a first and second source registers which each contain one or more source operands. A destination address 420 is used to store the result into a destination register. Since each register is addressed with six bits, sixty-four registers are possible in an on-chip register file. In this embodiment, all loads and stores are performed with the on-chip register file. However, other embodiments could allow addressing registers outside the processing core 12. An example of register type parallel add function is schematically shown in FIG. 6.

Referring to FIG. 4 once again, bits 31–18 of the register form 408 of the parallel add sub-instruction are the op codes 428 which are used by the processing core 12 to execute the sub-instruction 54. Various sub-instruction types have different amounts of bits devoted to op codes 428. For example, only bits 25–31 of the simm13 sub-instruction and bits 21–31 of the simm9 sub-instruction contain op codes 428.

As can be appreciated, the larger the number of bits required by the op code portion 428, the less the number of bits available for specifying the operands in the address portion 424.

Bits 28–31 indicate either a particular simm13 sub-instruction desired or that the simm9 or register forms 400, 408 are desired. For example, 14 of the possible combinations indicate a particular sub-instruction 54 that uses the simm13 form 404, while the remaining two combinations indicate an unknown function that uses the simm9 or register forms 400, 408. When bits 28–31 indicate a simm9 or register form 400, 408, bits 24–21 are read to determine which function is desired.

The size of the operands is indicated by two bits of the op code. Bit 27 is called the type low ("tl") bit and bit 20 is called the type high ("th") bit. These bits are used to indicate whether the partitioned source registers contain operands that are eight, sixteen or thirty-two bits wide.

Bits 18, 19 and 25–26 provide additional functionality to the add function which improves the number of instructions issued per cycle (IPC). Bit 18 is a set carry ("sc") bit that is used to indicate a carry into the adder. A bitwise inversion ("in") can be indicated by setting bit 19. As those skilled in the art can appreciate, bitwise inversion and carry features allow implementing such functions as A+B, A+B+1, A−B, and A−B−1. In this embodiment, immediate forms do not use the bitwise inversion or set carry because the compiler can adjust the immediate value instead. Bits 25–26 allow scaling the immediate value 404, 412 or second source register 432 by two, four or eight prior to addition. As discussed further below, these op code bits allow additional functionality that decreases the execution time for the processor.

5. Assembly Compilation

Typically, a compiler is used to convert assembly language or a higher level language into machine code that contains the op codes. As is understood by those skilled in the art, the op codes control multiplexors, other combinatorial logic and registers to perform a predetermined function. Furthermore, those skilled in the art appreciate there could be many different ways to implement op codes. The sole table lists some of the variations of the parallel add assembly language sub-instructions and some of the op codes associated therewith.

| Assemby Syntax | tl | th | in | sc | scale | instruction definition |
|---|---|---|---|---|---|---|
| add8 Rs1, #, Rd | 0 | — | — | — | — | 8 bit parallel add with immediate bits 0 to 7 |
| add16 Rs1, #, Rd | 1 | — | — | — | — | 16 bit parallel add with signed 9 bit immediate |
| add32 Rs1, #, Rd | 0 | — | — | — | — | 32 bit parallel add with signed 13 bit immediate |
|  | 1 | — | — | — | — | illegal op code |
| addttx2 Rs1, #, Rd | x | — | — | — | 01 | (parallel; tt = 8, 16, 32) add with immediate scaled by 2 |
| addttx4 Rs1, #, Rd | x | — | — | — | 10 | (parallel; tt = 8, 16, 32) add with immediate scaled by 4 |
| addttx8 Rs1, #, Rd | x | — | — | — | 11 | (parallel; tt = 8, 16, 32) add with immediate scaled by 8 |
| add8 Rs1, Rs2, Rd | 0 | 0 | 0 | 0 | 00 | 8 bit parallel add |
| add16 Rs1, Rs2, Rd | 1 | 0 | 0 | 0 | 00 | 16 bit parallel add |
| add32 Rs1, Rs2, Rd | 0 | 1 | 0 | 0 | 00 | 32 bit parallel add |
|  | 1 | 1 | — | — | — | illegal op code |
| add8p1 Rs1, Rs2, Rd | 0 | 0 | 0 | 1 | 00 | 8 bit parallel add + 1 |
| add16p1 Rs1, Rs2, Rd | 1 | 0 | 0 | 1 | 00 | 16 bit parallel add + 1 |
| add32p1 Rs1, Rs2, Rd | 0 | 1 | 0 | 1 | 00 | 32 bit parallel add + 1 |
| sub8 Rs1, Rs2, Rd | 0 | 0 | 1 | 1 | 00 | 8 bit parallel subtract |
| sub16 Rs1, Rs2, Rd | 1 | 0 | 1 | 1 | 00 | 16 bit parallel subtract |
| sub32 Rs1, Rs2 Rd | 0 | 1 | 1 | 1 | 00 | 32 bit parallel subtract |
| sub8ml Rs1, Rs2, Rd | 0 | 0 | 1 | 1 | 00 | 8 bit parallel subtract − 1 |
| sub16ml Rs1, Rs2, Rd | 1 | 0 | 1 | 1 | 00 | 16 bit parallel subtract − 1 |

-continued

| Assemby Syntax | tl | th | in | sc | scale | instruction definition |
|---|---|---|---|---|---|---|
| sub32ml Rs1, Rs2, Rd | 0 | 1 | 1 | 1 | 00 | 32 bit parallel subtract − 1 |
| opx2 | x | x | x | x | 01 | Add operation op (as above), with Rs2 pre-scaled by 2 |
| opx4 | x | x | x | x | 10 | Add operation op (as above), with Rs2 pre-scaled by 4 |
| opx8 | x | x | x | x | 11 | Add operation op (as above), with Rs2 pre-scaled by 8 |

As shown in the table, many different arithmetic functions are possible with this add sub-instruction. For example, additions and substractions (i.e., A+B and A−B) are possible as well as other functions (e.g., A+B+1 and A−B−1). Additionally, scaling of the second source operands is possible prior to the addition.

6. Parallel Arithmetic Implementation

Figure 7:
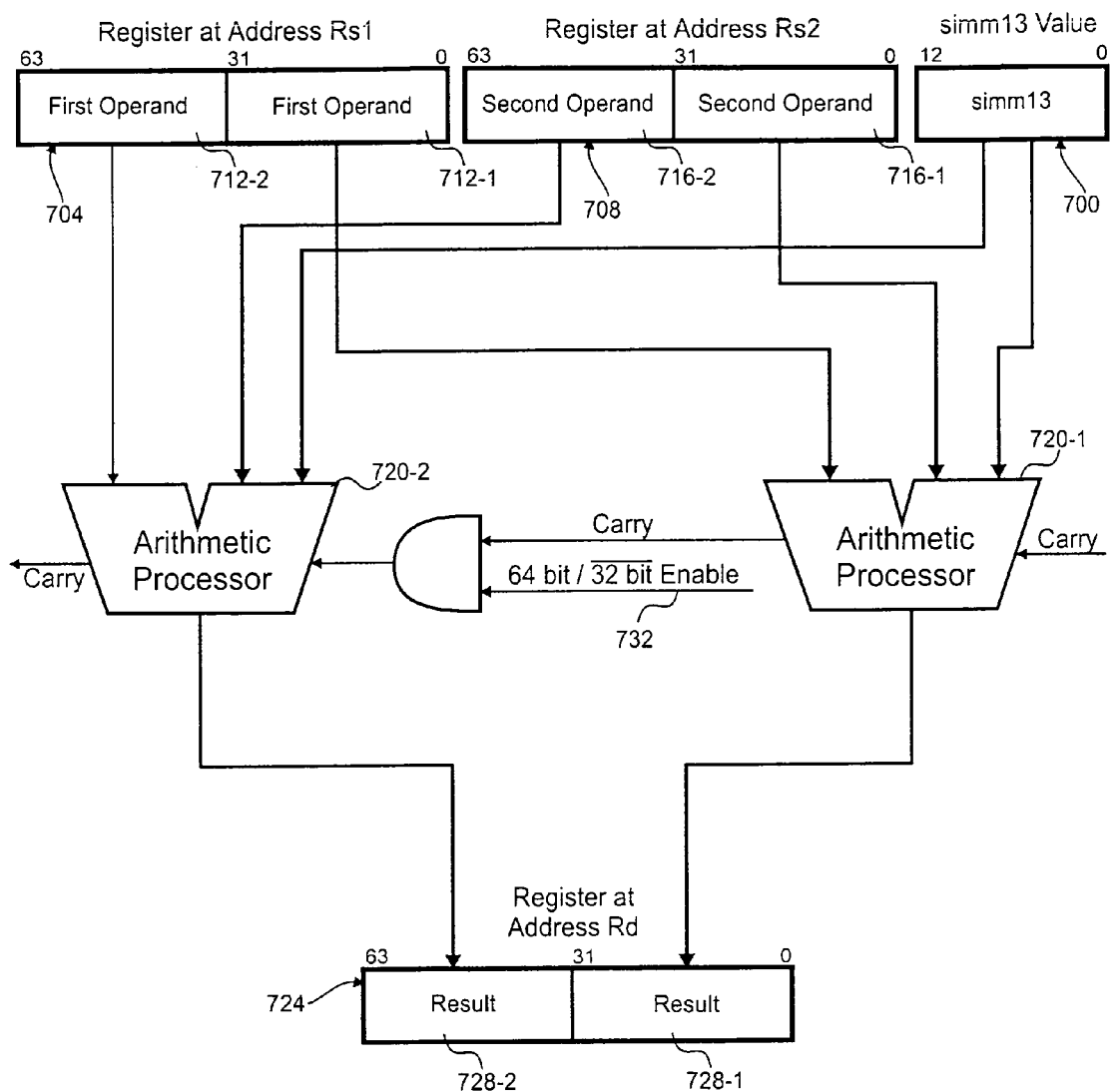
FIG. 7 is a block diagram depicting an embodiment of a portion of the processing core performing parallel arithmetic on two partitioned registers with two operands each.

With reference to FIG. 7, a block diagram of one embodiment of the parallel add function is shown. In this embodiment, the parallel add function includes a simm13 value 700, a first source register 704, a second source register 708, a number of arithmetic processors 720, and a destination register 724. The first source register 704 includes first source operands 712 and the second source register 704 includes second source operands 716. In this example, each of the source registers and destination register utilize the unsigned 32 data type 308 such that a gating signal 732 is set low to prevent the carry from the first arithmetic processor 720-1 from reaching the second arithmetic processor 720-2. The number of arithmetic processors 720 equals the number of operands in each source register 704, 708. Although not shown, there are additional arithmetic processors 720 for the data types that have more than two operands. If only one operand were stored in the source registers in some other embodiment such that sixty-four bit operations were performed, the gating signal 732 would be set high to allow passage of the carry bit between arithmetic processors 720.

The arithmetic processor 720 performs the parallel add and subtract functions. As discussed above, the op code of the sub-instruction controls which operands are loaded into the arithmetic processor and how the operands are processed. For example, the op code 428 indicates whether the second operand or an immediate value is loaded. After processing is completed, the results are written to the result register 724. Although not shown, those skilled in the art appreciate there is circuitry which allows selecting the various possible registers which hold the source operands and destination results.

Figure 8A:
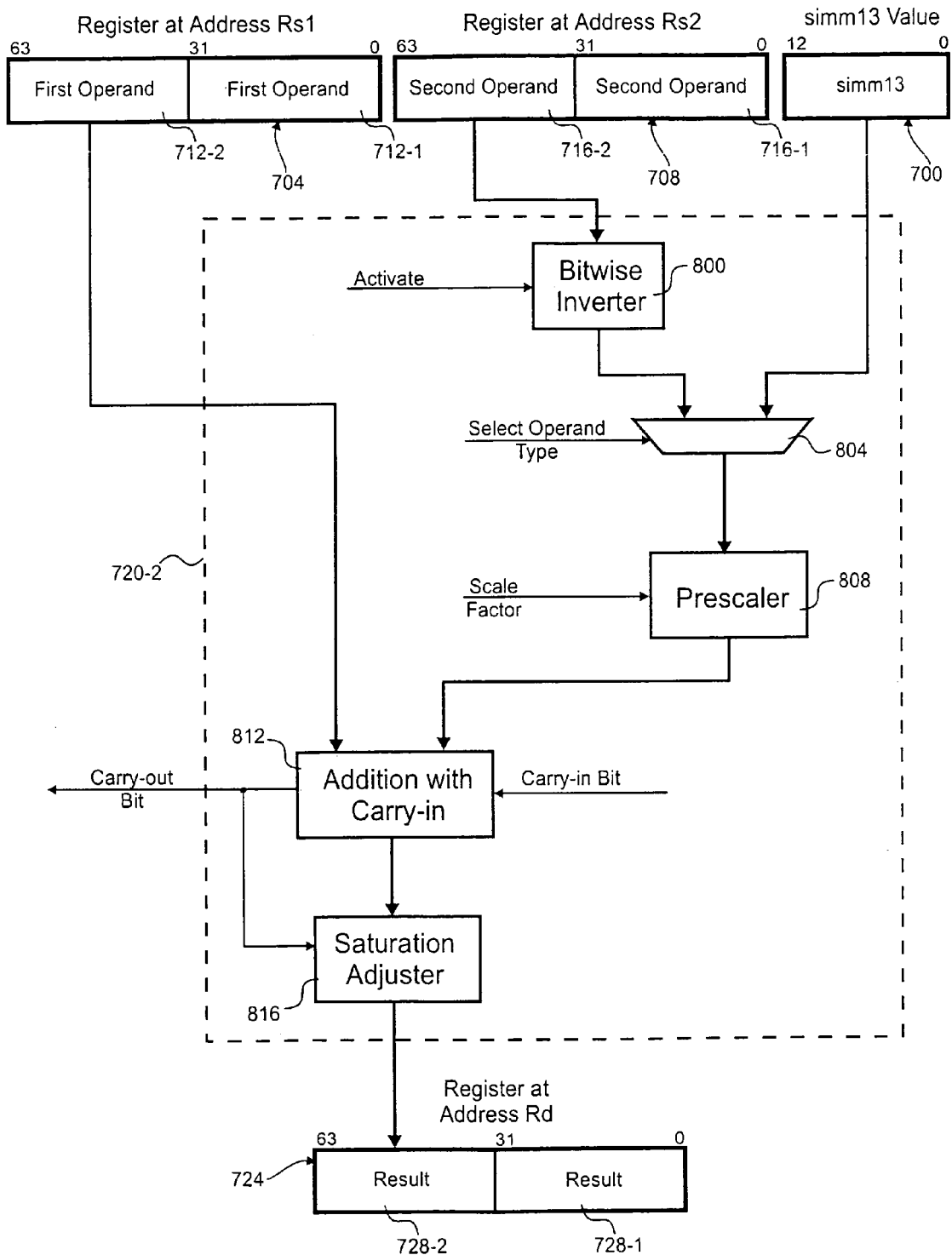
FIG. 8A is a block diagram showing one embodiment of an arithmetic processor for performing parallel addition and subtraction.

Referring next to FIG. 8A, a block diagram of portions of the processing core is shown which depicts a single arithmetic processor 720-2. Although, it is to be understood the number of arithmetic processors 720 is equal to the maximum number of operands in a partitioned register. The arithmetic processor 720-2 includes a bitwise inverter 800, an operand selection multiplexer 804, a prescaler 808, an addition with carry-in module 812, and a saturation adjuster 816.

If indicated by the op code 428, the bitwise inverter 800 inverts each bit in the second operand 716-2. The bitwise inverter 800 is used to perform parallel subtraction and related functions. For example, inverting the second operand and setting the carry-in bit will perform a subtraction between the first and second operands 712-2, 716-2 (i.e., A−B). Additionally, the function of the first operand 712-2 minus the second operand 716-2 minus one can be implemented by inverting the second operand and adding it to the first operand without a carry-in (i.e., A−B−1).

Depending upon the form of the sub-instruction, the operand selection multiplexer 804 selects the appropriate source operand for that addressing mode. The source operand could be a register 708 or any of the immediate forms 700 (i.e., simm9 or simm13 forms). However, in this embodiment only the simm13 form is available to the unsigned 32 data type 308 used in FIG. 8.

The prescaler 808 performs base 2 multiplication of either the second operand 716-2 or the simm13 value 700. Base 2 multiplication is implemented by shifting the operand according to a scale factor. Each shift is equivalent to multiplying the operator by two. Although this embodiment only multiplies in base 2, other embodiments could multiply in base 10.

The addition with carry-in module 812 performs addition of the first operand 712-2 and either the second operand 716-2 or immediate value 700. This is a two's complement addition. The carry bit is used to implement the various subtraction functions, as discussed above. Additionally, the addition module 812 can perform simple addition (i.e., A+B) as well as a simple addition plus one (i.e., A+B+1) by setting the carry-in bit and performing the addition. The carry-out bit is passed from the addition module 812 to any other higher order addition module in another arithmetic processor 720. The saturation adjuster 816 also uses the carry-out bit.

The saturation adjuster 816 allows adjusting the size of the result from the addition module 812 such that it fits in the result field 728-2 of the destination register 724. As those skilled in the art can appreciate, addition of two operands of the same bit width may produce a result of a greater width. To solve this problem, the saturation adjuster 816 saturates the result field 728-2 with the largest value that can be held in that field 728-2. For example, if the result field is unsigned and eight bits wide, values of zero through two hundred fifty-five can be held in that register. Accordingly, results that are in the range from two hundred fifty-six through five hundred eleven would result in two hundred fifty-five being stored in the result field. As those skilled in the art can appreciate, the value two hundred fifty-seven without this adjustment would appear as the value 1 after truncation without saturation adjustments. Especially for applications such as pixel manipulation, saturation adjustment is desirable because it more accurately reflects an oversized result.

Figure 8B:
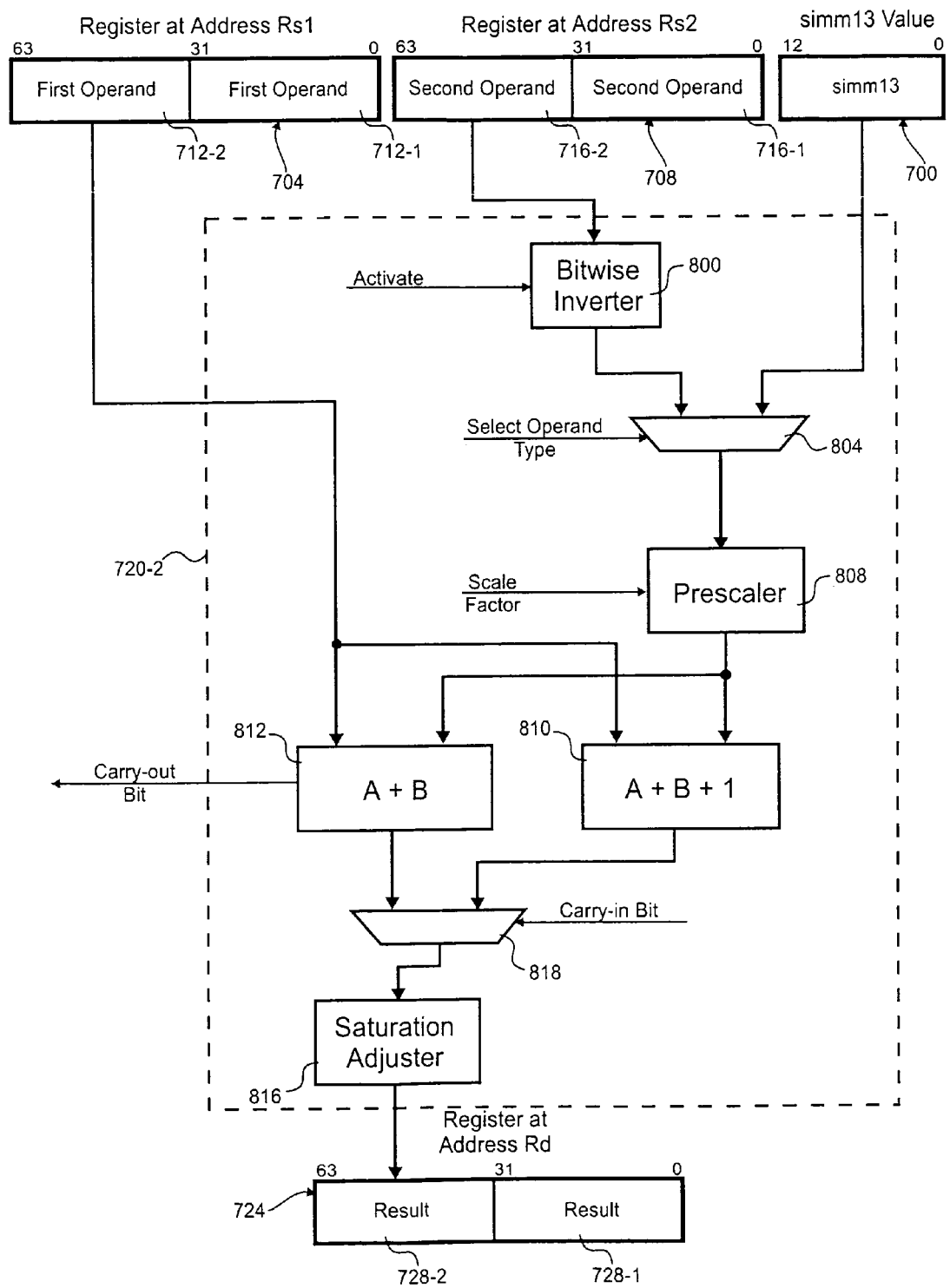
FIG. 8B is a block diagram showing another embodiment of an arithmetic processor for performing parallel addition and subtraction.

Referring next to FIG. 8B, a block diagram of another embodiment of portions of the processing core is shown which depicts a single arithmetic processor 720-2. This embodiment uses a carry look-ahead topology. Both A+B 812 and A+B+1 810 functions are performed in parallel. The carry-in bit is used to select with a multiplexer 818 which of the function outputs should be passed to the saturation adjuster 816. The carry-out bit is passed through the multiplexer 818 to the saturation adjuster 816. Although this embodiment breaks the sixty-four bit add function into two thirty-two bit functions, the add function could be broken up into any number of equal sized sub-functions. For example, the arithmetic processor could use eight, sixteen or thirty-two bit values.

Figure 9:
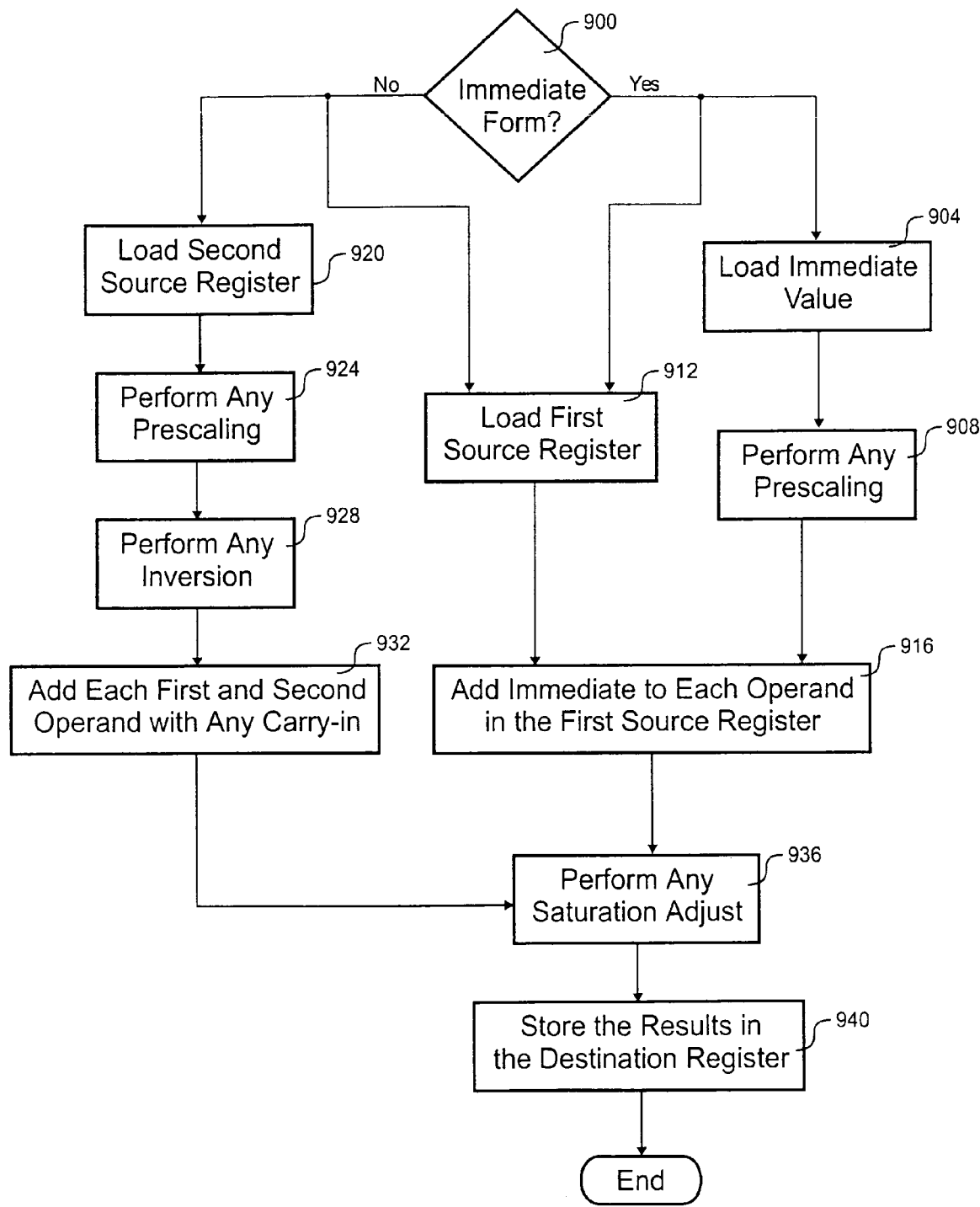
FIG. 9 is a flow diagram illustrating an embodiment of a method for performing parallel addition or subtraction.

With reference to FIG. 9, a flow diagram of the parallel addition and subtraction function is shown. When the processing core 12 loads the sub-instruction, processing begins at step 900 where a determination is made on the addressing format of the sub-instruction. As discussed above, the address portion 424 of the subinstruction can take simm9, simm13 or register forms. In step 900, a determination is made whether the addressing format is the immediate form. As discussed above, register addressed sub-instructions 408 parallel add each first source operand 712 with its respective second source op rand 716. However, immediate addressed sub-instructions parallel add the immediate value 700 to each first source operand 712.

If the immediate form 400, 404 is selected by the op code of the sub-instruction, the operands 712 in the first source register 704 and the immediate value 700 are loaded in steps 912 and 904. Any prescaling of the immediate value is performed in step 908. As discussed above, this embodiment allows prescaling by powers of two. In step 916, the scaled immediate value 700 is added to each operand 712 in the first source register 704. In this embodiment, the carry-in bit for immediate addressing form is not implemented. However, other embodiments could include this feature.

Processing for the register addressing form 408 of this sub-instruction is slightly different than the immediate addressing forms 400, 404. If the immediate addressing forms are not indicated by the sub-instruction op code 428 in step 900, the register addressing form 408 is presumed. In steps 912 and 920, the operands 712, 716 in the first and second source registers 704, 708 are loaded. Any prescaling of the second operand 716 is performed in step 924. Each source operand 716 in the second source register 708 is scaled in its respective arithmetic processor 720 by the predetermined amount dictated by the op code 428. In step 928, a bitwise inversion of each second source operand is performed if bit 19 of the op code 428 indicates an inversion. As discussed above, the bitwise inversion allows implementing the various subtraction functions. In step 932, addition of each first operand with its respective second operand is performed with an optional carry-in bit.

After the addition or subtraction is completed for the register and immediate forms in steps 932 and 916, the sum is adjusted to fit in the bit width of the destination register in step 936, if necessary. This adjustment is performed on each of the results from the multitude of arithmetic processors 720. As discussed above, saturation adjustment allows more effectively truncating the result. The result 728 from the adjusting step 936 is stored in the destination register 724 in step 940.

CONCLUSION

In conclusion, the present invention provides a parallel add or subtract function which allows prescaling and/or immediate addressing. While a detailed description of presently preferred embodiments of the invention have been given above, various alternatives, modifications, and equivalents will be apparent to those skilled in the art. For example, while the embodiment of the processing core discussed above relates to a processing core having a four-way VLIW processing pipeline, a processing core which did not have a VLIW structure could utilize the parallel add and subtract sub-instruction. In addition, although the adder only discussed a carry-in value of one, any integer value for a carry-in could be implemented in other embodiments. Therefore, the above description should not be taken as limiting the scope of the invention that is defined by the appended claims.

What is claimed is:

1. A processing core, comprising: a first source register including a plurality of first operands, wherein the source address of each first operand is identified in a single instruction; a plurality of second operands, wherein: the plurality of second operands are equal in value to an immediate value, and the immediate value is specified in the single instruction, a prescaler which scales the plurality of operands according to a predetermined scaling factor which is divisable by two; a bitwise inverter coupled to at least one of the first plurality of operands and the prescaled second plurality of operands; a destination register including a plurality of results, a plurality of arithmetic processors respectively coupled to the first operands, prescaled second operands and results, wherein each arithmetic processor computes one of a sum and a difference of the first operand and a respective prescaled second operand, and wherein the computation operation to be undertaken by each arithmetic processor is specified in the single instruction.

2. The processing core of claim 1, further comprising an integrated circuit which includes the first source register, destination register and arithmetic processor.

3. The processing core of claim 1, wherein:
each arithmetic processor computes at least one of:
the result of the first operand plus another operand plus the immediate value; and
the result of the first operand minus another operand minus the immediate value; and
each of the first operand, the another operand and the immediate value are represented with a plurality of bits.

4. The processing core of claim 1, wherein the immediate value is signed.

5. The processing core of claim 1, wherein a first width of the first source register is a positive integer multiple of a second width of the first operand.

6. The processing core of claim 1, wherein the sum and the difference are performed on a same carry look-ahead adder.

7. The processing core of claim 1, wherein the instruction is a very long instruction word (VLIW) instruction.

8. A method for performing arithmetic processing, the method comprising the steps of: loading a first and second operands from a primary source register; loading a third and fourth operands, wherein: the third and fourth operands are an immediate value specified in an single instruction, and the third and fourth operands are equal in value; scaling the third and fourth operands according to a predetermined scaling factor which is divisable by two; performing an arithmetic function on the first and scaled third operands to produce a first result; performing the arithmetic function on the second and scaled fourth operands to produce a second result, and storing the first and second results in a destination register.

9. The method for performing arithmetic processing of claim 8, further comprising a step of inverting the third and fourth operands.

10. The method for performing arithmetic processing of claim 8, further comprising a step of adjusting at least one of the first and second results to avoid saturation of the destination register.

11. The method for performing arithmetic processing of claim 8, wherein the step of performing an arithmetic function on the first and third operands comprises calculating the first operand plus the third operand plus a positive integer, wherein each of the first operand, the third operand and the positive integer are each represented with a plurality of bits.

12. The method for performing arithmetic processing of claim 8, wherein the step of performing an arithmetic function on the second and fourth operands comprises calculating the second operand minus the fourth operand minus a positive integer, wherein each of the first operand, the third operand and the positive integer are each represented with a plurality of bits.

13. The method for performing arithmetic processing of claim 8, wherein the two performing steps are performed, at least partially, coextensive in time.

14. The method for performing arithmetic processing of claim 8, wherein the two performing steps use a ripple look-ahead adder.

15. The method for performing arithmetic processing of claim 8, wherein the steps of the method are initiated by a single instruction issue.

16. A method for performing arithmetic processing, comprising the steps of: receiving a single instruction comprising an arithmetic function to be performed using an immediate value, and operands from first and second source addresses in a primary source register, wherein the immediate value and the first and second source addresses are specified in the single instruction; loading a first and second operands respectively from the first and second addresses in the primary source register, loading a third and fourth operand each comprising the immediate value; scaling the third and the fourth operand according to a predetermined scaling factor which is divisable by two; performing the arithmetic function on the first operand and the scaled third operand to produce a first result; performing the arithmetic function on the second operand and the scaled fourth operand to produce a second result; and storing the first and second results in a destination register.

17. The method for performing arithmetic processing of claim 16, wherein the immediate value is comprised of nine bits.

18. The method for performing arithmetic processing of claim 16, wherein the immediate value is comprised of thirteen bits.

19. The method for performing arithmetic processing of claim 16, wherein the two performing steps are performed, at least partially, coextensive in time.

20. The method for performing arithmetic processing of claim 16, further comprising a step of adjusting at least one of the first and second results to avoid saturation of the destination register.

* * * * *